US010771453B2

(12) United States Patent
Nam et al.

(10) Patent No.: US 10,771,453 B2
(45) Date of Patent: Sep. 8, 2020

(54) USER-TO-USER INFORMATION (UUI) CARRYING SECURITY TOKEN IN PRE-CALL AUTHENTICATION

(71) Applicant: Cisco Technology, Inc., San Jose, CA (US)

(72) Inventors: Kim Nam, Alpharetta, GA (US); Dusko Zgonjanin, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 115 days.

(21) Appl. No.: 15/397,757

(22) Filed: Jan. 4, 2017

(65) Prior Publication Data

US 2018/0191703 A1 Jul. 5, 2018

(51) Int. Cl.
*H04L 29/06* (2006.01)
*H04M 3/436* (2006.01)

(52) U.S. Cl.
CPC .......... *H04L 63/083* (2013.01); *H04L 63/126* (2013.01); *H04L 65/105* (2013.01); *H04L 65/1006* (2013.01); *H04L 65/1016* (2013.01); *H04L 65/1033* (2013.01); *H04L 65/1069* (2013.01); *H04M 3/436* (2013.01); *H04L 63/0838* (2013.01); *H04L 63/0846* (2013.01); *H04M 2203/6027* (2013.01); *H04M 2203/6081* (2013.01)

(58) Field of Classification Search
CPC .. H04M 3/38; H04M 3/42382; H04M 3/0029; H04M 3/436; H04M 2203/6081; H04M 2203/6027; H04Q 13/13095; H04L 63/083; H04L 65/105; H04L 65/1033; H04L 65/1016; H04L 65/1069; H04L 63/126; H04L 65/1006; H04L 63/0846; H04L 63/0838
See application file for complete search history.

(56) References Cited

U.S. PATENT DOCUMENTS

| | | | | | |
|---|---|---|---|---|---|
| 5,974,142 | A | * | 10/1999 | Heer | H04K 1/00 379/442 |
| 6,041,054 | A | * | 3/2000 | Westberg | H04Q 11/0478 370/389 |
| 6,049,530 | A | * | 4/2000 | Petersen | H04Q 11/0478 370/248 |

(Continued)

FOREIGN PATENT DOCUMENTS

KR 2009043688 7/2009

OTHER PUBLICATIONS

TZu et al., Toward Authenticated Caller ID Transmission: The Need for a Standardized Authentication Scheme in Q.731.3 Calling Line Identification Presentation, 2016, ITU.*

(Continued)

*Primary Examiner* — David Garcia Cervetti
(74) *Attorney, Agent, or Firm* — Behmke Innovation Group LLC; James M. Behmke; James J. Wong (57) ABSTRACT

In one embodiment, a telecommunication apparatus includes a processor to generate a telephone call set-up message including a user-to-user information (UUI) field, and include a security token in the UUI field of the telephone call set-up message, and a network interface to send the telephone call set-up message to a telephone network. Related apparatus and methods are also described.

17 Claims, 8 Drawing Sheets

(56) References Cited

U.S. PATENT DOCUMENTS

| | | | | |
|---|---|---|---|---|
| 6,151,319 | A * | 11/2000 | Dommety | H04L 12/4608 370/395.52 |
| 6,154,448 | A * | 11/2000 | Petersen | H04Q 11/0478 370/216 |
| 6,222,859 | B1 * | 4/2001 | Yoshikawa | H04L 12/5692 370/522 |
| 6,266,343 | B1 * | 7/2001 | Caves | H04Q 11/0478 370/395.61 |
| 6,370,251 | B1 * | 4/2002 | Hardy | H04L 9/0897 380/286 |
| 6,857,072 | B1 * | 2/2005 | Schuster | H04L 63/0428 380/277 |
| 7,024,688 | B1 * | 4/2006 | Faccin | H04L 67/147 726/4 |
| 7,324,645 | B1 * | 1/2008 | Juopperi | H04W 12/0609 380/247 |
| 8,683,194 | B2 * | 3/2014 | Battistello | H04L 9/083 713/155 |
| 8,804,961 | B2 * | 8/2014 | Guo | H04W 12/02 380/270 |
| 9,060,057 | B1 | 6/2015 | Danis | |
| 9,420,010 | B2 * | 8/2016 | Efrati | H04M 7/129 |
| 9,942,752 | B1 * | 4/2018 | Marimuthu | H04W 12/04 |
| 10,149,156 | B1 * | 12/2018 | Tiku | H04L 9/0825 |
| 2002/0150086 | A1 * | 10/2002 | Bailey | H04L 29/1216 370/352 |
| 2002/0177433 | A1 * | 11/2002 | Bravo | H04L 63/0853 455/411 |
| 2003/0101086 | A1 * | 5/2003 | San Miguel | G06Q 10/10 705/7.13 |
| 2003/0235281 | A1 * | 12/2003 | Williams | H04M 3/38 379/196 |
| 2004/0068653 | A1 * | 4/2004 | Fascenda | H04L 63/0853 713/168 |
| 2004/0120486 | A1 | 6/2004 | Creamer et al. | |
| 2004/0133685 | A1 * | 7/2004 | Jaaskela | H04M 15/00 709/227 |
| 2004/0255158 | A1 * | 12/2004 | Lin | H04L 63/083 726/9 |
| 2005/0132060 | A1 * | 6/2005 | Mo | H04L 51/12 709/227 |
| 2005/0182781 | A1 * | 8/2005 | Bouvet | H04L 29/12066 |
| 2006/0208889 | A1 | 9/2006 | Shaffer et al. | |
| 2007/0127447 | A1 * | 6/2007 | Cho | H04L 65/1069 370/356 |
| 2007/0150736 | A1 * | 6/2007 | Cukier | H04W 12/0608 713/172 |
| 2007/0201447 | A1 * | 8/2007 | Wright | H04L 63/0807 370/356 |
| 2007/0255952 | A1 * | 11/2007 | Zhou | H04L 9/0841 713/168 |
| 2008/0072303 | A1 * | 3/2008 | Syed | H04L 63/0838 726/10 |
| 2008/0192910 | A1 | 8/2008 | Guedalia et al. | |
| 2009/0003321 | A1 * | 1/2009 | Bian | H04M 3/42382 370/352 |
| 2009/0061868 | A1 * | 3/2009 | Kazmi | H04M 17/00 455/435.1 |
| 2009/0067439 | A1 * | 3/2009 | Yamamoto | H04L 63/061 370/400 |
| 2010/0020744 | A1 * | 1/2010 | Muratore | H04W 76/10 370/328 |
| 2010/0088236 | A1 * | 4/2010 | Karabulut | G06F 21/10 705/59 |
| 2010/0215177 | A1 | 8/2010 | Lobzakov et al. | |
| 2010/0293385 | A1 * | 11/2010 | Nanda | H04L 63/08 713/176 |
| 2011/0026699 | A1 | 2/2011 | Amir et al. | |
| 2011/0235802 | A1 * | 9/2011 | Kokkinen | H04W 12/04031 380/247 |
| 2011/0312301 | A1 * | 12/2011 | Muller | H04W 12/10 455/411 |
| 2013/0077617 | A1 * | 3/2013 | Hillis | H04L 12/66 370/352 |
| 2013/0136261 | A1 * | 5/2013 | Guo | H04L 63/18 380/270 |
| 2013/0254614 | A1 * | 9/2013 | Kumar | H04L 63/0428 714/748 |
| 2014/0359733 | A1 * | 12/2014 | Marquez | H04L 63/0846 726/6 |
| 2016/0065550 | A1 * | 3/2016 | Kanov | H04W 12/04 726/7 |
| 2016/0094988 | A1 * | 3/2016 | Lee | H04W 12/0608 380/270 |
| 2016/0165044 | A1 * | 6/2016 | Chan | H04M 3/42102 455/413 |
| 2016/0212617 | A1 * | 7/2016 | Koshimizu | H04L 9/3271 |
| 2016/0360413 | A1 * | 12/2016 | Norrman | H04W 36/0022 |
| 2018/0309740 | A1 * | 10/2018 | Brun | H04L 9/006 |

OTHER PUBLICATIONS

Mazurczyk et al., New VoIP Traffic Security Scheme with Digital Watermarking, 2006, SPringer-Verlag.*

Reaves et al., AuthentiCall: Efficient Identity and Content Authentication for Phone Calls, Aug. 2017, USENIX.*

Fujii et al., Telelogin: a Two-factor Two-path Authentication Technique Using Caller ID, Aug. 2008, NTT Technical Review.*

* cited by examiner

USER-TO-USER INFORMATION (UUI) CARRYING SECURITY TOKEN IN PRE-CALL AUTHENTICATION

TECHNICAL FIELD

The present disclosure generally relates to using user-to-user information (UUI) carrying a security token in pre-call authentication.

BACKGROUND

By way of introduction, phone phishing or fraud calls are in a growing trend recently. The danger of these fraud calls goes beyond the danger to regular users when these calls are placed to the Internet of Things (IoT) connected-car systems where they may distract drivers by taking the driver's attention away from driving. Fraud calls may also be problematic in other domains.

Traditionally, blocking calls from unwanted callers may be achieved by validating the caller ID within the telephone network before calls reach the receivers. This method checks the caller ID information and blocks calls except those from the caller ID on an allowed caller-ID list. This service is called a whitelist or caller ID filtering service, and it is widely deployed.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a telecommunication apparatus including a processor to generate a telephone call set-up message including a user-to-user information (UUI) field, and include a security token in the UUI field of the call set-up message, and a network interface to send the telephone call set-up message to a telephone network.

There is also provided in accordance with another embodiment of the present disclosure, a authentication system including a network interface to receive a first message from a telecommunication component prior to a telephone call being established, the message including a user-to-user information (UUI) field and being associated with the telephone call, and a processor to extract a security token from the UUI field of the message, authenticate the security token yielding a result, and prepare a response message based on the result for sending to the telecommunication component, wherein the network interface is operative to send the response message to the telecommunication component.

DETAILED DESCRIPTION

By way of introduction, as fraudsters become smarter, fraud calls may involve the manipulation of the caller ID to make the calls look like they come from a trusted source. A caller ID spoofing technique that alters a fraudster's real caller ID to an allowed caller ID impacts whitelist services validating only the caller ID. So even if whitelist services work as expected, unwanted calls may still be established with connected-car subscribers, and the like, when the caller ID is deliberately falsified by fraudsters.

Figure 1:
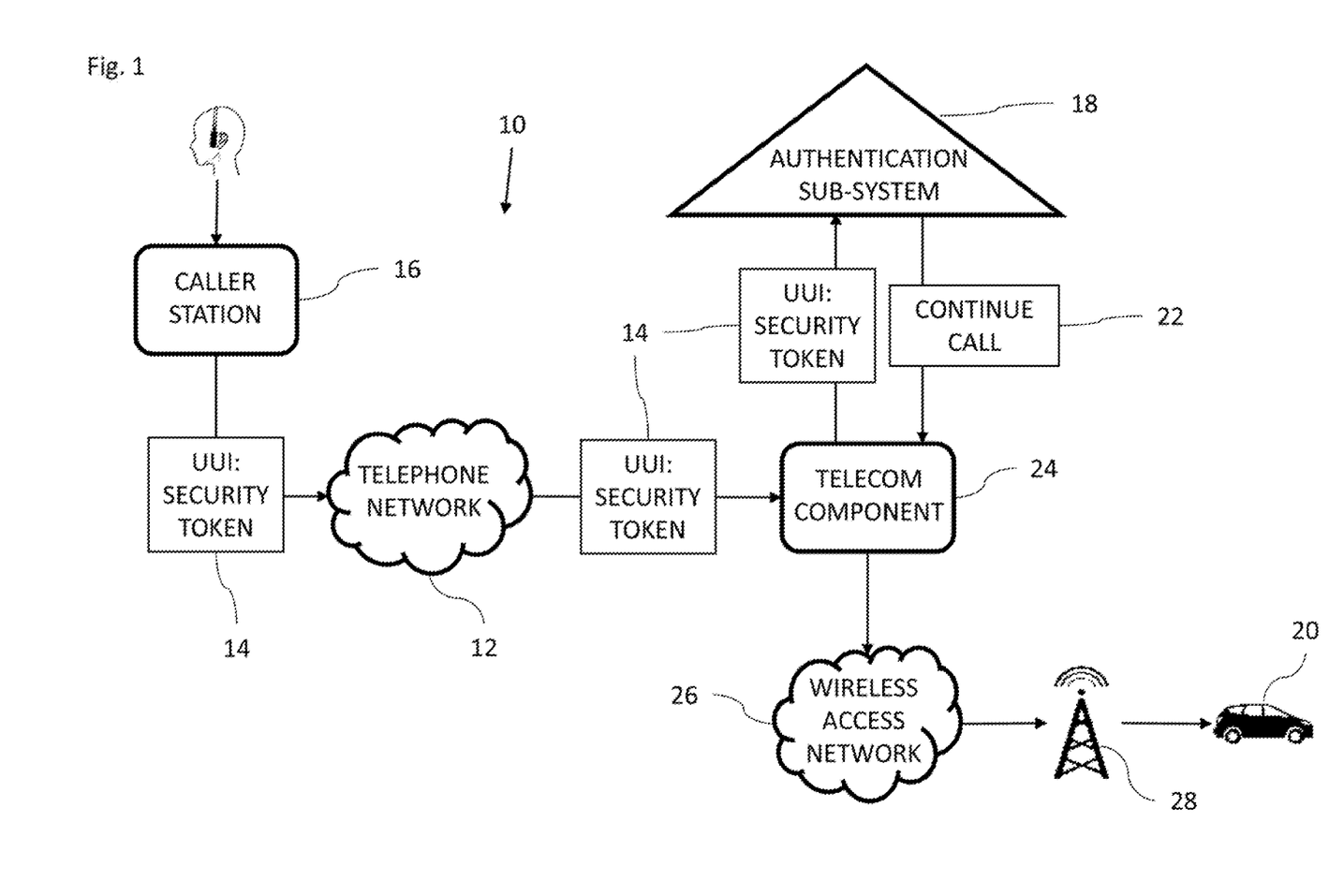
FIG. 1 is a partly pictorial, partly block diagram view of a telecommunication system authorizing a telephone call constructed and operative in accordance with an embodiment of the present disclosure.

Reference is now made to FIG. 1, which is a partly pictorial, partly block diagram view of a telecommunication system 10 authorizing a telephone call constructed and operative in accordance with an embodiment of the present disclosure. In overview, the telecommunication system 10 authenticates an authentication key included in a security token which is included in a User-to-User information (UUI) field 14 passed by a telephone network 12 to allow establishment of authorized calls and to block unauthorized calls. It should be noted that the UUI field 14 may be known as a UUI element or UUI header or UUI parameter, by way of example only, depending on the different terminology used by different standards. The term UUI field, as used in the specification and claims, is defined herein to include any suitable UUI field, for example, but not limited to, a UUI element, a UUI header or a UUI parameter.

The authentication key is embedded in the security token which in turn is included in the UUI field 14 by a caller station 16, for example, an enterprise SoftSwitch or private branch exchange (PBX) in a caller center. The caller station 16 generally includes the UUI field 14 in a call setup signaling message which is passed to the telephone network 12.

The authentication key may be generated by various different standard methods, but the selected method typically makes the prediction of successive authentication keys difficult so that an attacker cannot easily guess the authentication key based on a prior authentication key. The authentication key generation methods may include time-synchronized or hash function based one-time password methods that makes the authentication key valid for one-use or for a short period of time. The key generation method generally avoids a static password that may be vulnerable to a replay attack.

As described above, the generated authentication key is delivered in a security token by the UUI field 14. The UUI field 14 may be used for passing the authentication key in various telephone network signaling protocols, for example, but not limited to: Integrated Services Digital Network (ISDN); Signaling System No. 7 (SS7); and/or Session Initiation Protocol (SIP). The User-to-User information may be passed during various phases of a call. The telecommunication system 10 uses the UUI field 14 to pass the security token when the call is in the setup phase.

The authentication key carried by the UUI field 14 is transferred transparently through the telephone network 12. The UUI field 14 is reported to an authentication sub-system 18 (e.g., an authentication application service) by a telecommunication component 24 (e.g., Gateway Mobile Switching Centre (GMSC) in a GSM network or Serving Call Session Control Function (S-CSCF) in a Voice over Long-Term Evolution (VoLTE) network) before the telephone call is established with a subscriber 20, e.g., a connected-car subscriber. When the authentication key is conveyed to the authentication sub-system 18, the authentication sub-system 18 extracts the security token from the UUI field 14 and authenticates the telephone call by running an algorithm that authenticates the security token by authenticating the authentication key. When the authentication key is deemed to be valid, the telephone call has been authenticated and the authentication sub-system 18 sends a response message 22 to the telecommunication component 24 authorizing continuation of establishment of the telephone call via a wireless access network 26 and a transmitter(s) 28 to the subscriber 20 as shown in FIG. 1.

Figure 2:
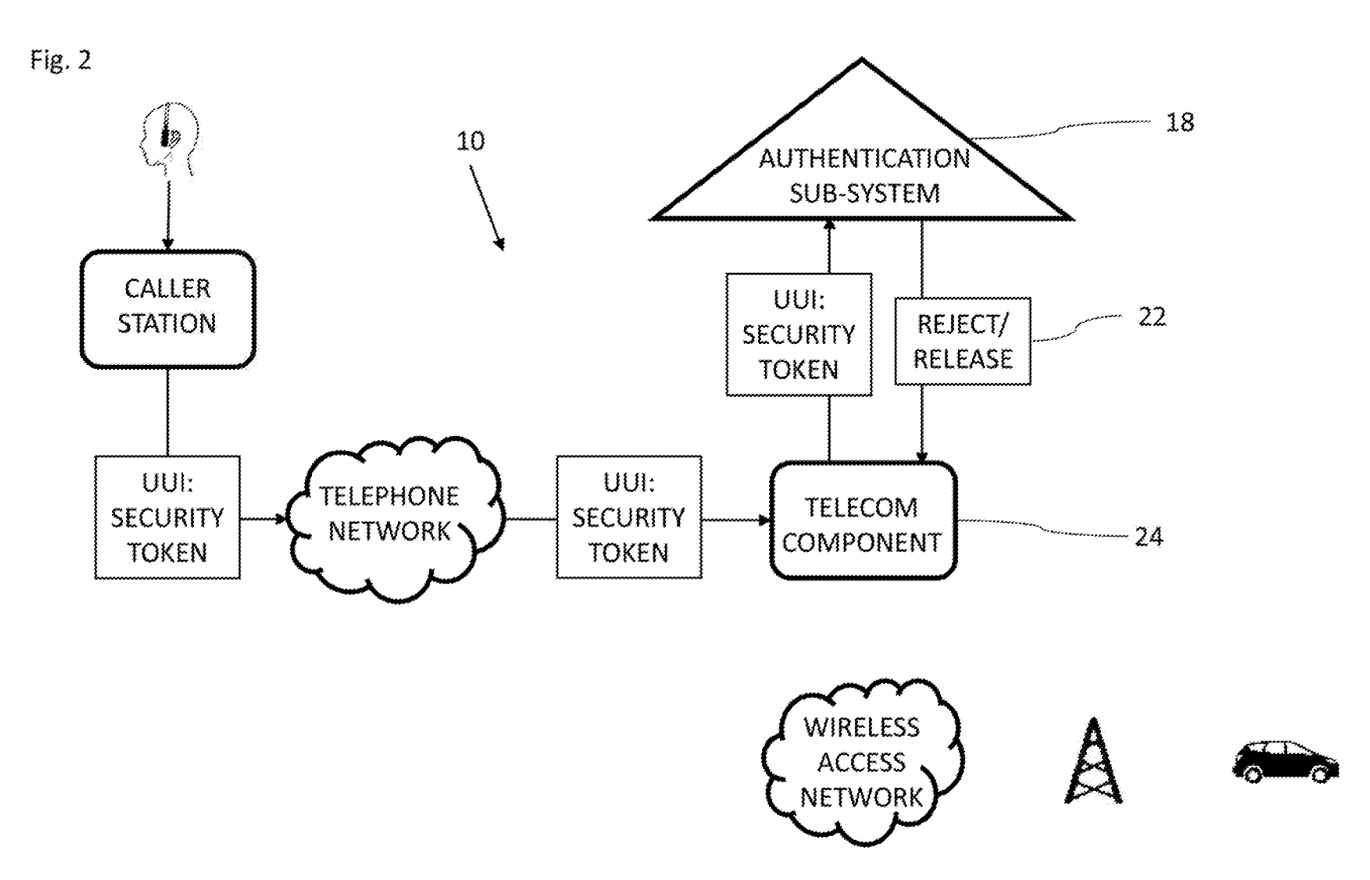
FIG. 2 is a partly pictorial, partly block diagram view of the telecommunication system of FIG. 1 rejecting or releasing a call.

Reference is now made to FIG. 2, which is a partly pictorial, partly block diagram view of the telecommunication system 10 of FIG. 1 rejecting or releasing a call. If the authentication key is deemed to be invalid by the authentication sub-system 18, thereby not authenticating the telephone call, the authentication sub-system 18 sends the response message 22 to the telecommunication component 24 rejecting or releasing the telephone call. It will be appreciated that the authentication key validation algorithms may depend on the key generation method, thus the validation algorithm(s) and the key generation method are generally pre-agreed or synchronized with each other, for example, via a securely shared seed or key(s).

Figure 3:
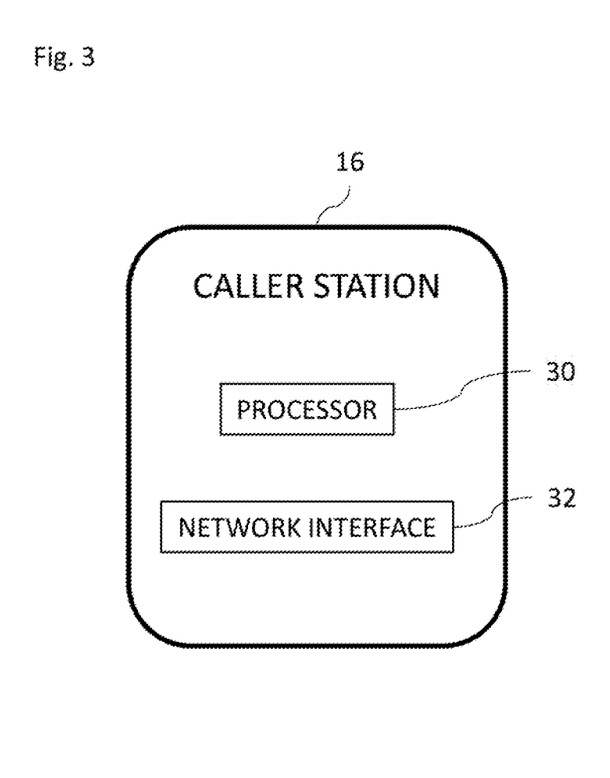
FIG. 3 is a block diagram view of a caller station in the system of FIG. 1.

Reference is now made to FIG. 3, which is a block diagram view of the caller station 16 in the system 10 of FIG. 1. Among other standard components of a caller station, the caller station 16 includes a processor 30 and a network interface 32.

Figure 4:
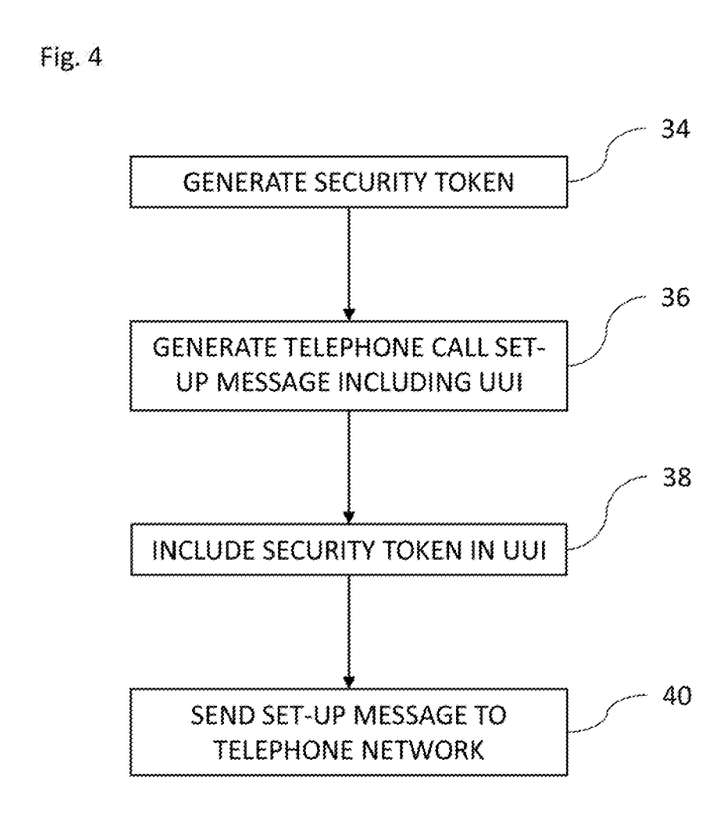
FIG. 4 is a flow chart showing exemplary steps in a method of operation of the caller station of FIG. 3.

Reference is now made to FIG. 4, which is a flow chart showing exemplary steps in a method of operation of the caller station 16 of FIG. 3. The processor 30 (FIG. 3) of the caller station 16 is operative to generate a security token (block 34). The security token includes an authentication key. The security token is typically a one-time use security token and the processor 30 is operative to generate a new security token to include in the UUI field 14 (FIG. 1) for each new telephone call that is initiated by the caller station 16. It will be appreciated that for new telephone calls directed to recipients that do not use call authentication, the processor 30 does not need to generate a security token or include a security token in the UUI field 14. The processor 30 is operative to generate a telephone call set-up message including the UUI field 14 (block 36) and include the security token in the UUI field 14 of the call set-up message (block 38). The network interface 32 (FIG. 3) of the caller station 16 is operative to send the telephone call set-up message to the telephone network 12 (FIG. 1) (block 40). The security token is used by the authentication service 18 (FIG. 1) which authenticates the security token (typically by authenticating the authentication key inside the security token) in order to determine whether a telephone call originating from the caller station 16 should be established.

Figure 5:
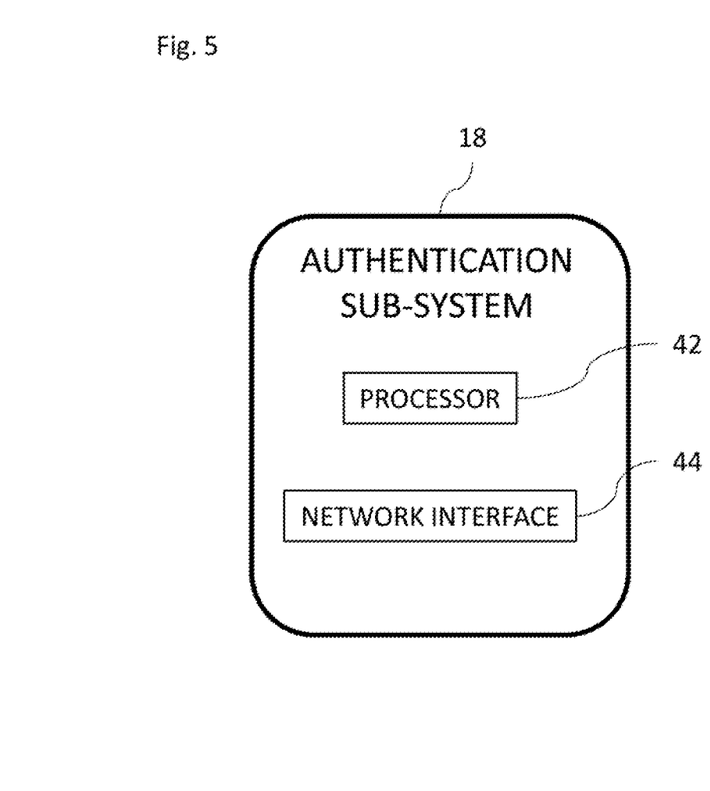
FIG. 5 is a block diagram view of an authentication sub-system in the system of FIG. 1.

Reference is now made to FIG. 5, which is a block diagram view of the authentication sub-system 18 in the system 10 of FIG. 1. The authentication sub-system 18 includes a processor 42 and a network interface 44.

Figure 6:
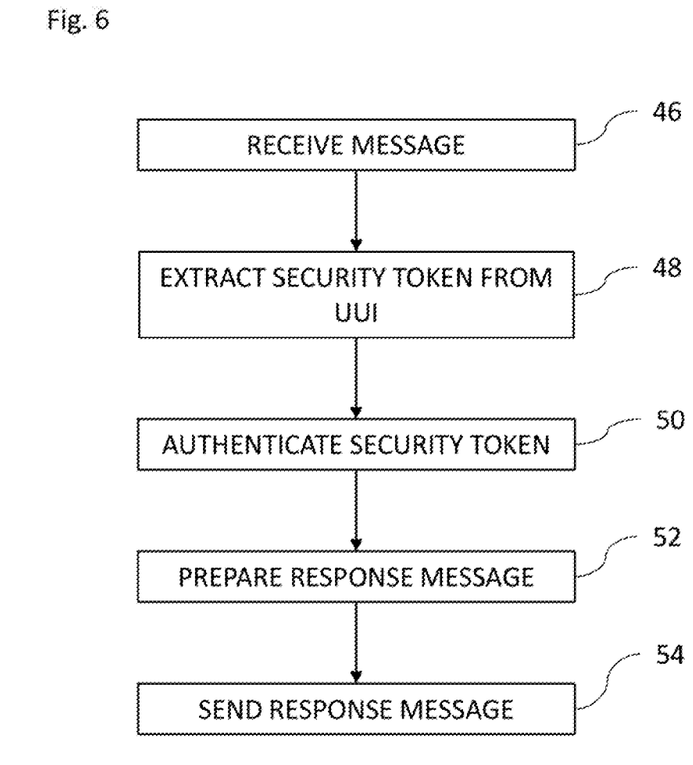
FIG. 6 is a flow chart showing exemplary steps in a method of operation of the authentication sub-system of FIG. 5.

Reference is now made to FIG. 6, which is a flow chart showing exemplary steps in a method of operation of the authentication sub-system 18 of FIG. 5. The network interface 44 (FIG. 5) of the authentication sub-system 18 is operative to receive a message (e.g., a Customized Applications for Mobile networks Enhanced Logic (CAMEL) Application Part (CAP) initial detection point (IDP) message in a GSM network; or a Session Initiation Protocol (SIP) INVITE message in a VoLTE network) from the telecommunication component 24 (FIG. 1) (e.g., GMSC in a GSM network; or S-CSCF in a VoLTE network) prior to a new telephone call being established (block 46). For ease of reference, this message will be referred to as "the initial message" in the following paragraphs. The initial message includes the UUI field 14 (FIG. 1) and is associated with the new telephone call.

The processor 42 (FIG. 5) is operative to extract a security token from the UUI field 14 of the initial message (block 48). The security token includes an authentication key. The processor 42 is operative to authenticate the security token (by authenticating the authentication key) yielding a result (e.g., valid or invalid, authenticated or not authenticated) (block 50). The processor 42 is operative to prepare the response message 22 (FIG. 1) based on the result of the authentication for sending to the telecommunication component 24 (FIG. 1) (block 52).

If the security token is deemed valid based on the authentication, the processor 42 (FIG. 5) is operative to prepare the response message 22 (FIG. 1) indicating that the telephone call establishment process should continue. If the security token is deemed valid, in a GSM network the response message 22 may be a CAP Continue (CUE) message and in a VoLTE network the response message 22 may be a new SIP INVITE message. The processing in a GSM network and a VoLTE network is described in more detail with reference to FIGS. 7-10.

If the security token is deemed invalid based on the authentication, the processor 42 is operative to prepare the response message 22 (FIG. 2) indicating that the telephone call is unauthorized or that the telephone call should be released, by way of example only. If the security token is deemed invalid, in a GSM network the response message 22 may be a CAP ReleaseCall (REL) message and in a VoLTE network the response message 22 may be a SIP response message with a request failure response code 403 (Forbidden).

The network interface 44 (FIG. 5) is operative to send the response message 22 to the telecommunication component (block 54).

Figure 7:
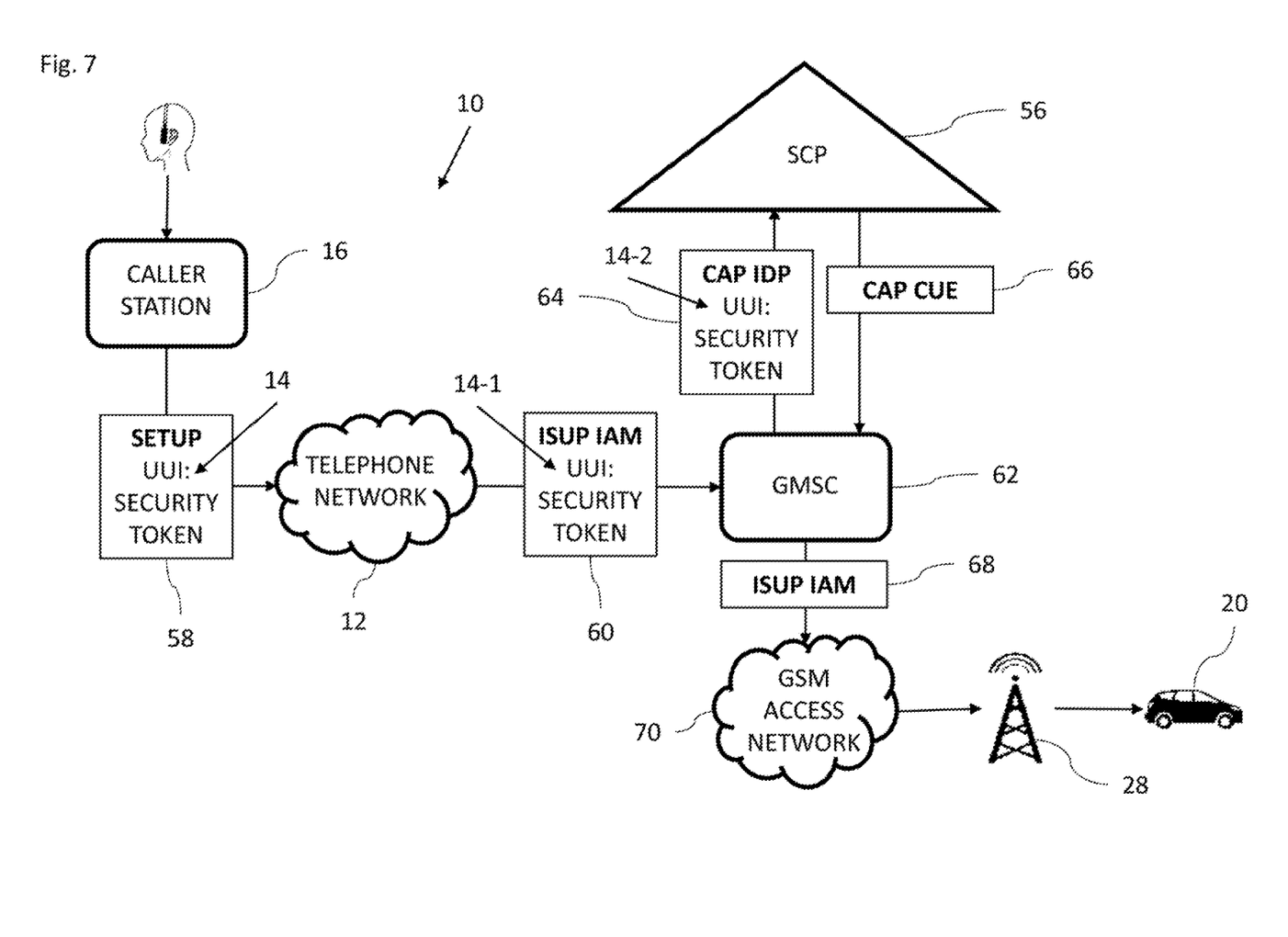
FIG. 7 is a partly pictorial, partly block diagram view of the telecommunication system of FIG. 1 authorizing a telephone call in a Global System for Mobile Communications (GSM) network.

Reference is now made to FIG. 7, which is a partly pictorial, partly block diagram view of the telecommunication system 10 of FIG. 1 authorizing a telephone call in a GSM network. The telecommunication system 10 is now described by way of example in a GSM network. In overview, in the GSM network, the functionality of the authentication sub-system 18 (FIG. 1) is performed by a Service Control Point (SCP) application 56. The SCP application 56 executes a service application once the SCP application 56 gains control of a GSM call during various phases of a call. The SCP application 56 runs the call authentication application when the call is in a setup phase. A fuller description of the GSM call flow is now described below.

When the caller station 16 originates a call to the subscriber 20, the caller station 16 generates an authentication key for inclusion in a security token as described above. The format of the security token is typically ASCII and the length of the token typically has a maximum length depending on the signaling network that caller station 16 is using. In some signaling networks the length of the token may have a maximum length of 32 or 128 octets, by way of example. Once the caller station 16 generates the security token, the caller station 16 includes the security token in the UUI field 14 in a call setup message 58 in the respective access network, for example, but not limited to, ISDN User Part (ISUP) of SS7, ISDN, or SIP.

When the setup message 58 for a call is processed by a respective switch(s) in the telephone network 12, the setup message 58 is translated in to an ISUP signaling message. The telephone network 12 supports the translation of the setup message 58 in multiple signaling to ISUP signaling including ISDN to ISUP, SIP to ISUP or ISUP to ISUP. There are several types of ISUP, however regardless of ISUP types, the authentication key and security token in the UUI field 14 in the original setup message 58 is carried over to an ISUP Initial Address Message (IAM) 60 transparently. The ISUP IAM 60 includes the security token in its UUI field 14-1 and is sent to a GMSC 62. The GMSC 62 is a switching node that controls mobile terminating calls to a GSM subscriber.

The service switching function (SSF) (not shown) running on the GMSC 62, in accordance with the GSM standard, contacts the SCP application 56 using the CAMEL Application Protocol (CAP) with a CAP initial DP (IDP) message 64, and the SSF passes the call control to the SCP application 56. Once the call control is passed to the SCP application 56, the call setup process is suspended at the GMSC 62 until the instruction is received from the SCP application 56. The security token presented in the UUI field 14-1 of the ISUP IAM 60 for call establishment is copied into a UUI field 14-2 in the CAP IDP message 64 according to CAMEL standard (3rd Generation Partnership Project (3GPP) Technical Specification (TS) 23.087, CAMEL phase 4 in 3GPP Rel-6 by way of example).

Upon being contacted by the GMSC 62, the SCP application 56 executes the call authentication application to authenticate the telephone call by running an algorithm to check the authentication key carried inside UUI field 14-2 in the CAP IDP message 64. When the authentication key is valid and the call is authenticated by the authentication application, the establishment of the call continues. When a call is allowed, the SCP application 56 requests the GMSC 62 to continue call establishment by sending a CAP Continue (CUE) message 66. When the GMSC 62 receives the CAP CUE message 66 from the SCP application 56, the GMSC 62 continues call establishment by forwarding an ISUP IAM message 68 to a GSM mobile switch (not shown) in a GSM access network 70. Before the GMSC 62 forwards the ISUP IAM message 68, the GMSC 62 runs a procedure to locate the GSM mobile switch in which the subscriber 20 is registered. When the GMSC 62 continues the call setup, the GMSC 62 forwards the ISUP IAM message 68 to a switching node, called a mobile switching center (MSC), that serves the subscriber 20, and the call is established with the subscriber 20 via the transmitter 28.

Figure 8:
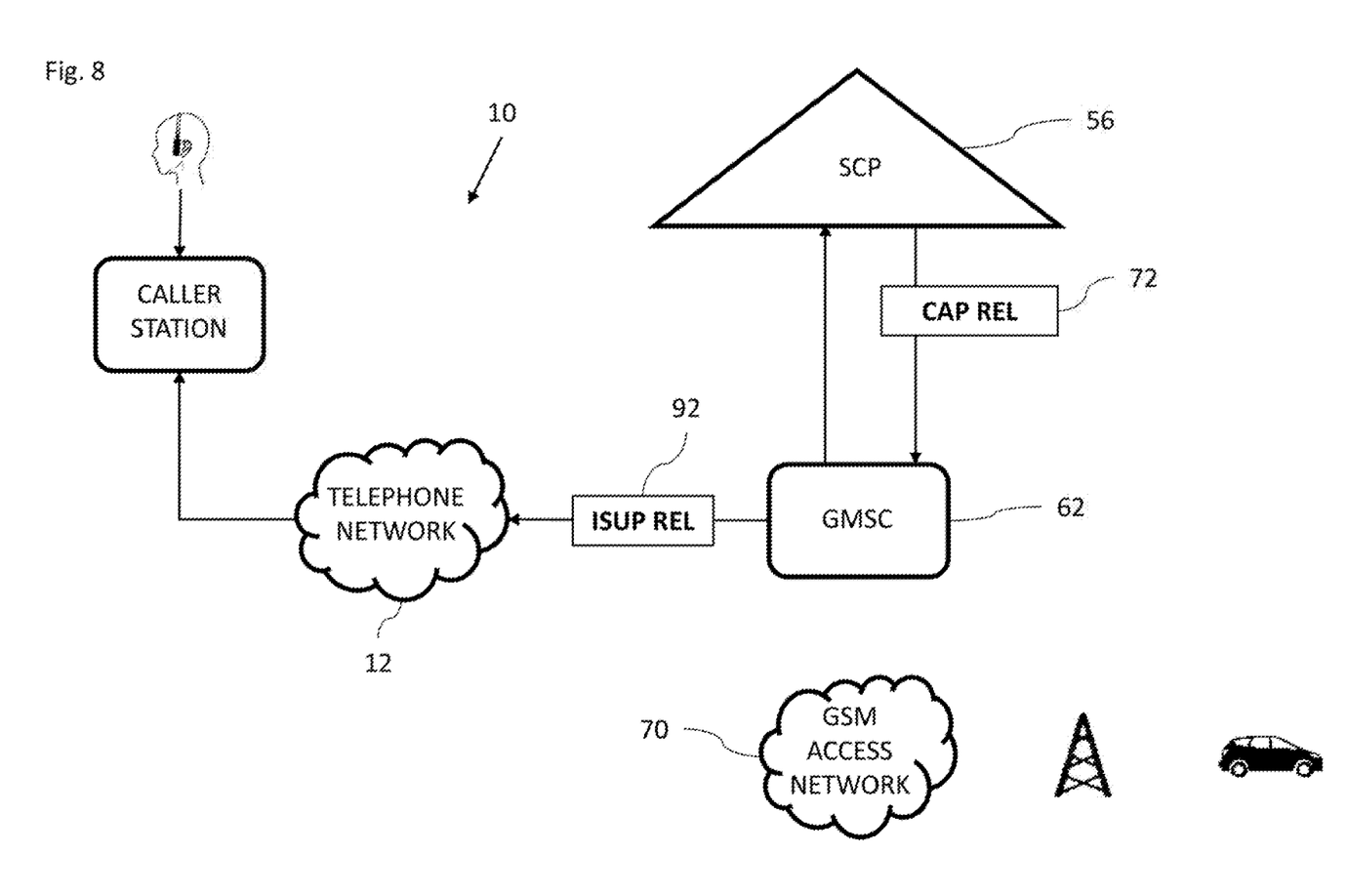
FIG. 8 is a partly pictorial, partly block diagram view of the telecommunication system of FIG. 1 releasing a call in a GSM network.

Reference is now made to FIG. 8, which is a partly pictorial, partly block diagram view of the telecommunication system 10 of FIG. 1 releasing a call in the GSM network. When the authentication key is deemed invalid by the SCP application 56, the call is denied. When a call is denied, a CAP ReleaseCall (REL) message 72 is sent to the GMSC 62. When the GMSC 62 receives the CAP REL message 72 from the SCP application 56, the GMSC 62 halts the call establishment process by returning an ISUP REL message 92 back to the telephone network 12 where the call was originated from.

Figure 9:
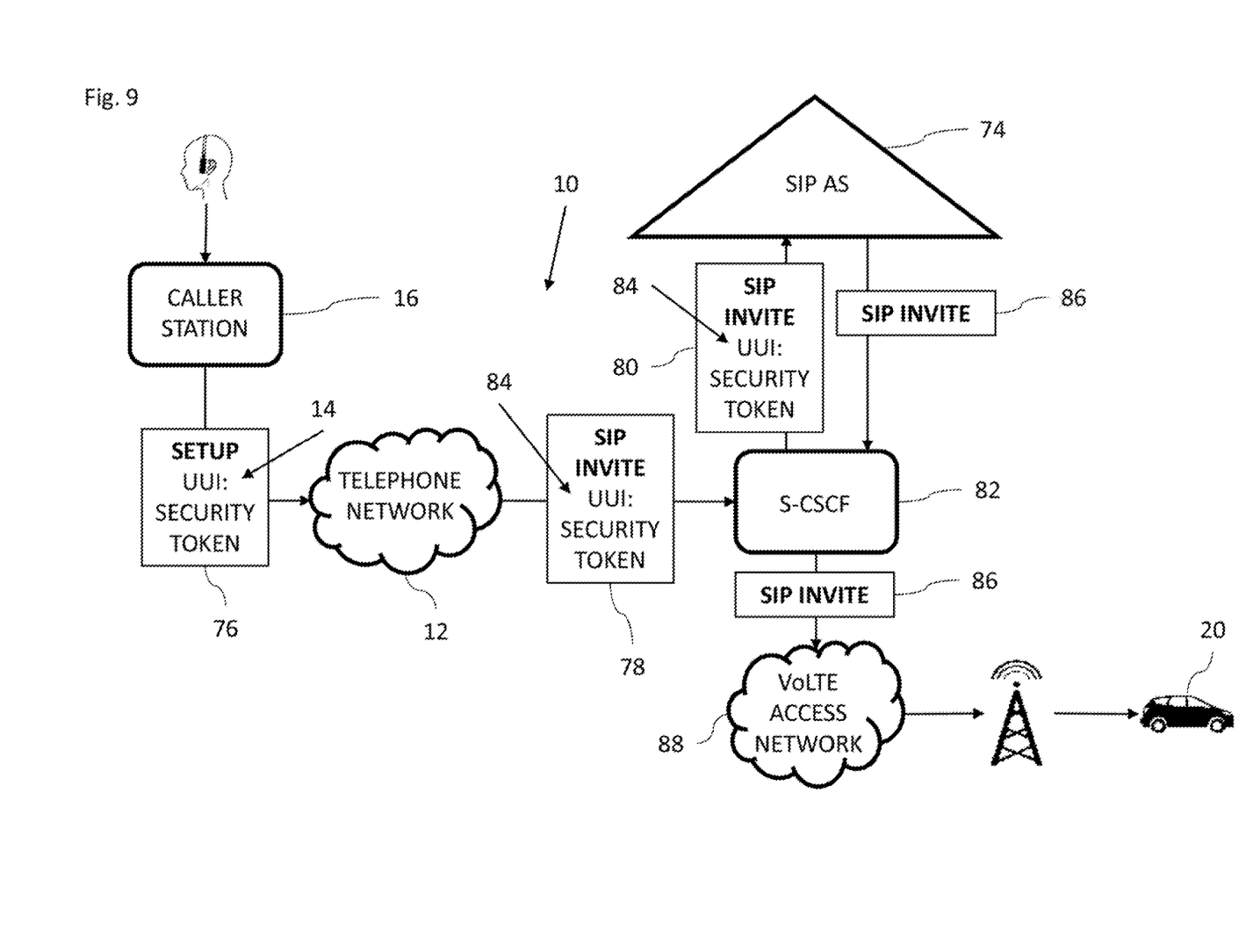
FIG. 9 is a partly pictorial, partly block diagram view of the telecommunication system of FIG. 1 authorizing a telephone call in a Voice over Long-Term Evolution (VoLTE) network.

Reference is now made to FIG. 9, which is a partly pictorial, partly block diagram view of the telecommunication system 10 of FIG. 1 authorizing a telephone call in a VoLTE network. The telecommunication system 10 is now described by way of example in a VoLTE network. By way of introduction, an application server (AS) within IP Multimedia Subsystem (IMS) is used to execute the authentication service for the subscriber 20 (e.g., a connected car subscriber) who is registered in the VoLTE network. The application server in the IMS is a Session Initiation Protocol (SIP) application server (AS) 74 that runs service applications once a call setup message is received from the IMS network. A fuller description of the VoLTE call flow is now described below.

When the caller station 16 originates a call to the subscriber 20, the caller station 16 generates an authentication key in substantially the same way that the authentication key is generated in a GSM network. Once the caller station 16 generates the authentication key, the caller station 16 includes the authentication key in the UUI field 14 in a call setup message 76 in the respective access network, for example, but not limited to, ISUP, ISDN, or SIP. When the setup message 76 for a call is processed by a respective switch(s) in the telephone network 12, the call setup message 76 is transformed into a Session Initiation Protocol (SIP) INVITE message 78 (when the subscriber 20 is registered with the VoLTE network) by a Media Gateway Control Function (not shown) associated with the VoLTE network. The Media Gateway Control Function initiates the SIP INVITE message 78 to an S-CSCF 82. The SIP INVITE message 78 includes the authentication key passed from the original setup message 76 in a UUI field 84 inside the SIP INVITE message 78. Before the SIP INVITE message 78 is sent to the S-CSCF 82 other CSCF nodes may be involved in order to find the correct S-CSCF to serve the SIP INVITE message 78.

The S-CSCF 82 interfaces with the SIP AS 74 to invoke a specific service that the VoLTE call requires. The S-CSCF 82 may select the Application Server running the authentication service application based on criteria information using the subscriber's profile information. Subsequently S-CSCF sends a SIP INVITE message 80 to the SIP AS 74. The authentication key presented in the UUI field 84 in the SIP INVITE message 78 is carried transparently to the SIP AS 74 via the SIP INVITE message 80. Upon receiving the SIP INVITE message 80 from the S-CSCF 82, the SIP AS 74 executes the call authentication application to authenticate the call by running the algorithm that checks the authentication key carried inside the UUI field 84 in the SIP INVITE message 80.

If the authentication key is valid, the call is authenticated, and call establishment may continue. In such a case, the SIP AS 74 requests the S-CSCF 82 to continue the call establishment by sending a new SIP INVITE message 86 to the S-CSCF 82. When the S-CSCF 82 receives the SIP INVITE message 86 from the SIP AS 74, the S-CSCF 82 continues call setup by sending the SIP INVITE message 86 to the next appropriate node in a VoLTE access network 88. A voice termination call to the called party 20 is then established in the VoLTE access network 88.

Figure 10:
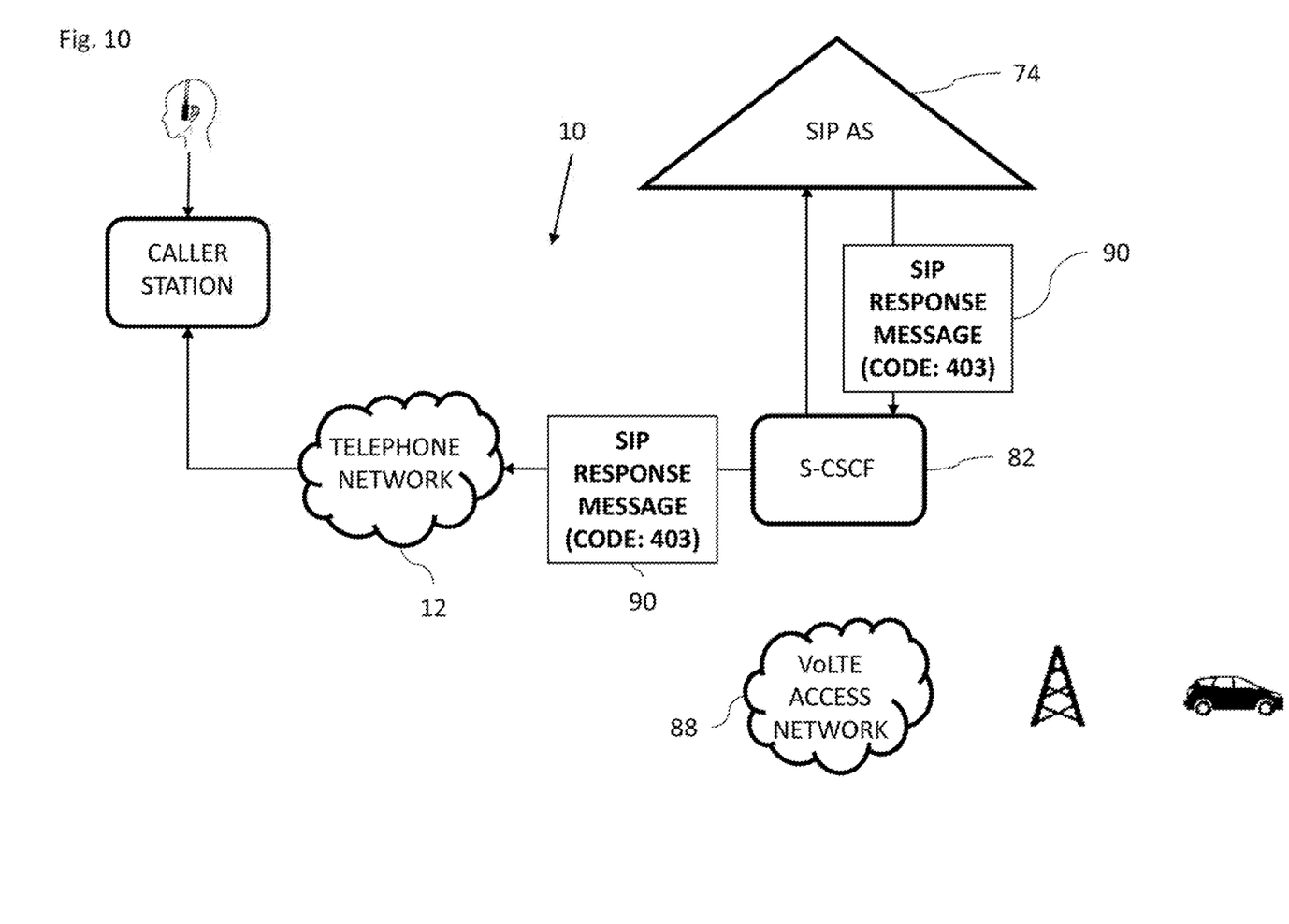
FIG. 10 is a partly pictorial, partly block diagram view of the telecommunication system of FIG. 1 rejecting a call in a VoLTE network.

Reference is now made to FIG. 10, which is a partly pictorial, partly block diagram view of the telecommunication system 10 of FIG. 1 rejecting a call in the VoLTE network. When the authentication key is invalid, the call is denied. When a call is denied, the SIP AS 74 returns a SIP response message 90 with request failure response code 403 (Forbidden), to the S-CSCF 82. Then the S-CSCF 82 passes the same SIP response message 90 back to the telephone network 12, which in turn rejects the call.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A telecommunication apparatus, comprising:
   a hardware processor in a caller station where telephone calls are initiated, the hardware processor configured to:
   generate a telephone call set-up message associated with a telephone call, the telephone call set-up message including a user-to-user information (UUI) field,
   generate a security token which includes an authentication key that is embedded in the security token at the caller station prior to initiating the telephone call,
   include the security token in the UUI field of the telephone call set-up message, and
   establish the telephone call once an authentication subsystem in a telecommunication component of a telecommunication system authenticates the authentication key that is embedded in the security token of the UUI field of the telephone call set-up message, wherein the authentication subsystem sends a response message to the telecommunication component after authenticating the authentication key that is embedded in the security token, wherein if the security token is deemed valid based on the authenticating, the response message indicates that a telephone call establishment process should continue, further wherein if the security token is deemed invalid based on the authenticating, the response message indicates that the telephone call is unauthorized or that the telephone call should be released; and
   a network interface configured to:
   send the telephone call set-up message through a telephone network to the authentication subsystem before the telephone call is established with a subscriber.

2. The apparatus according to claim 1, wherein: the security token is a one-time use security token; and the processor is operative to generate a new security token to include in the UUI field for a new telephone call that is initiated.

3. The apparatus according to claim 1, wherein the security token is used by an authentication service which authenticates the security token in order to determine whether a telephone call originating from the telecommunication apparatus should be established.

4. The apparatus according to claim 1, wherein the telecommunication component comprises a Serving Call Session Control Function (S-CSCF).

5. The apparatus according to claim 4, wherein the telephone call set-up message comprises a CAMEL Application Part (CAP) initial detection point (IDP) message and the response message comprises a CAP Continue (CUE) message.

6. The apparatus according to claim 1, wherein the telecommunication component comprises a Gateway Mobile Switching Centre (GMSC).

7. The apparatus according to claim 6, wherein the telephone call set-up message comprises a Session Initiation Protocol (SIP) INVITE message and the response message comprises a SIP INVITE message.

8. An authentication system, comprising:
   a network interface device to receive a message from a telecommunication component of a telecommunication system prior to a telephone call being established, the message generated by a caller station where telephone calls are initiated and including a user-to-user information (UUI) field associated with the telephone call; and
   a hardware processor executing on the network device to:
   extract an authentication key embedded in a security token from the UUI field of the message, wherein the security token is generated with an authentication key at the caller station prior to initiating the telephone call;
   authenticate the authentication key yielding a result; and
   prepare a response message based on the result for sending to the telecommunication component, wherein if the security token is deemed valid based on the authentication, the processor is operative to prepare the response message indicating that a telephone call establishment process should continue for the telephone call, further wherein if the security token is deemed invalid based on the authentication, the processor is operative to prepare the response message indicating that the telephone call is unauthorized or that the telephone call should be released, wherein the network interface is operative to send the response message to the telecommunication component, wherein, when the authentication system authenticates the authentication key in the UUI field of the message, the telephone call is established subsequent to the telecommunication component receiving the response message.

9. The system according to claim 8, wherein the telecommunication component comprises a Gateway Mobile Switching Centre (GMSC).

10. The system according to claim 9, wherein the message comprises a CAMEL Application Part (CAP) initial detection point (IDP) message and the response message comprises a CAP Continue (CUE) message.

11. The system according to claim 8, wherein the telecommunication component comprises a Serving Call Session Control Function (S-CSCF).

12. The system according to claim 11, wherein the message comprises a Session Initiation Protocol (SIP) INVITE message and the response message comprises a SIP INVITE message.

13. An authentication method, comprising:
receiving a message from a telecommunication component of a telecommunication system prior to a telephone call being established, the message generated by a caller station where telephone calls are initiated and including a user-to-user information (UUI) field and being associated with the telephone call;
extracting an authentication key embedded in a security token from the UUI field of the message, wherein the security token is generated with an authentication key at the caller station prior to initiating the telephone call;
authenticating the authentication key yielding a result;
preparing a response message based on the result for sending to the telecommunication component, wherein if the security token is deemed valid based on the authentication, the response message is prepared indicating that a telephone call establishment process should continue for the telephone call, further wherein if the security token is deemed invalid based on the authentication, the response message is prepared indicating that the telephone call is unauthorized or that the telephone call should be released; and
sending the response message to the telecommunication component, wherein, when the authentication system authenticates the authentication key in the UUI field of the message, the telephone call is established subsequent to the telecommunication component receiving the response message.

14. The method according to claim 13, wherein the telecommunication component comprises a Gateway Mobile Switching Centre (GMSC).

15. The method according to claim 14, wherein the message comprises a CAMEL Application Part (CAP) initial detection point (IDP) message and the response message comprises a CAP Continue (CUE) message.

16. The method according to claim 13, wherein the telecommunication component comprises a Serving Call Session Control Function (S-CSCF).

17. The method according to claim 16, wherein the message comprises a Session Initiation Protocol (SIP) INVITE message and the response message comprises a SIP INVITE message.

* * * * *